United States Patent
Reiser et al.

(10) Patent No.: US 7,485,889 B2
(45) Date of Patent: Feb. 3, 2009

(54) APPARATUS FOR CAPTURING INFORMATION CONTAINED IN A PHOSPHOR LAYER

(75) Inventors: Georg Reiser, Munich (DE); Robert Fasbender, Ottobrunn (DE); Magath Niang, München (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 141 days.

(21) Appl. No.: 10/832,054

(22) Filed: Apr. 26, 2004

(65) Prior Publication Data
US 2004/0232365 A1 Nov. 25, 2004

(30) Foreign Application Priority Data
May 21, 2003 (EP) .................... 03101459

(51) Int. Cl.
*G03B 42/08* (2006.01)
(52) U.S. Cl. .................................... 250/586
(58) Field of Classification Search .................. 250/586
See application file for complete search history.

(56) References Cited

U.S. PATENT DOCUMENTS

| 4,749,861 | A | * | 6/1988 | Watanabe | 250/586 |
| 5,455,428 | A | | 10/1995 | Miyagawa | |
| 5,506,417 | A | * | 4/1996 | Brandt | 250/586 |
| 6,504,167 | B2 | * | 1/2003 | Ikami | 250/584 |

(Continued)

FOREIGN PATENT DOCUMENTS

| JP | 2002-107848 A | 10/2002 |
| WO | WO 03/029848 A1 | 4/2003 |

OTHER PUBLICATIONS

EPO Application 03101459 Search Report dated Sep. 2003.
Patent Abstracts of Japan, Publication No. 2002-107848, Published Oct. 4, 2002.
English translation of Japanese Patent No. JP 2002-107848, Published Oct. 4, 2002. Translation by Intellectual Property Document Library, http://www.wipo.int/ipdl/en/.

*Primary Examiner*—David P Porta
*Assistant Examiner*—Shun Lee
(74) *Attorney, Agent, or Firm*—Houston Eliseeva LLP

(57) ABSTRACT

The invention relates to an apparatus for capturing information contained in a phosphor layer, comprising an irradiation device (4) for irradiating the phosphor layer (1) with stimulation light (3) which is adapted to stimulate emission light (7) in the phosphor layer (1), the irradiation device (4) including with the normal (L) on the phosphor (1) layer a first angle of inclination ($\alpha_S$), and comprising a detection device (10) for capturing emission light (7) stimulated in the phosphor layer (1), the detection device (10) including with the normal (L) on the phosphor layer (1) a second angle of inclination ($\alpha_D$).

To reduce losses of intensity and definition it is provided according to the invention that the first angle of inclination ($\alpha_S$) of the irradiation device (4) and the second angle of inclination ($\alpha_D$) of the detection device (10) are selected such that components of the stimulation light (3) reflected by the phosphor layer (1) and then by the detection device (10) impinge on zones (15) of the phosphor layer (1) in which emission light (7) has already been stimulated.

3 Claims, 1 Drawing Sheet

U.S. PATENT DOCUMENTS

| | | |
|---|---|---|
| 6,642,535 B2 | 11/2003 | Gebele et al. |
| 2002/0024030 A1* | 2/2002 | Karasawa ................... 250/584 |
| 2002/0036277 A1 | 3/2002 | Karasawa |
| 2002/0090184 A1* | 7/2002 | Sayag ........................ 385/120 |
| 2003/0111620 A1 | 6/2003 | Gebele et al. |
| 2004/0129904 A1* | 7/2004 | Kuwabara ................... 250/585 |

* cited by examiner

APPARATUS FOR CAPTURING INFORMATION CONTAINED IN A PHOSPHOR LAYER

FIELD OF THE INVENTION

The invention relates to an apparatus for capturing information contained in a phosphor layer.

BACKGROUND OF THE INVENTION

Generic apparatuses are used, in particular, for medical purposes in the field of computer radiography (CR). X-ray exposures are recorded in a phosphor layer, X-radiation which passes through an object, for example a patient, being stored as a latent image in the phosphor layer. To read out the latent image the phosphor layer is irradiated with stimulation light, the phosphor layer emitting emission light corresponding to the latent image, which emission light is captured by an optical detector and converted into electrical signals. The electrical signals may be further processed as required and displayed on a monitor, or outputted on a suitable output device, e.g., a printer.

Known from the prior art are apparatuses in which the stimulation light emitted by a radiation device impinges at a specific angle on the phosphor layer, in a linear zone of which it stimulates emission light which is captured at a specific angle by a detector. In order to capture the entire latent image stored in the phosphor layer the irradiation device and the detection device are moved relative to the phosphor layer, whereby the linear zones of the phosphor layer are successively stimulated and read out.

In the apparatuses known from the prior art, depending on the selection of the angles at which the stimulation light impinges on the phosphor layer and at which the emission light emitted by the phosphor layer is detected, losses in the intensity of the emission light to be detected, and/or in the definition of the linear zone of the phosphor layer stimulated, occur in certain applications. In these cases the high quality of the image information read out, which is required for reliable medical diagnosis, cannot be guaranteed.

SUMMARY OF THE INVENTION

It is an object of the invention to specify an apparatus for capturing information contained in a phosphor layer in which losses of intensity and/or of definition are as small as possible.

This object is achieved according to the invention by an apparatus for capturing information contained in a phosphor layer, comprising an irradiation device for irradiating the phosphor layer with stimulation light which is adapted to stimulate emission light in the phosphor layer, the irradiation device including with the normal (L) on the phosphor layer a first angle of inclination ($\alpha_S$), and a detection device for capturing emission light stimulated in the phosphor layer, the detection device including with the normal (L) on the phosphor layer a second angle of inclination ($\alpha_D$), wherein the first angle of inclination ($\alpha_S$) of the irradiation device and the second angle of inclination ($\alpha_D$) of the detection device are selected such that components of the stimulation light reflected by the phosphor layer and then by the detection device impinge on zones of the phosphor layer in which emission light has already been stimulated.

Through the setting of the angles of inclination of the irradiation device and of the detection device according to the invention, stimulation light which is reflected by the phosphor layer and then by the detection device is prevented from impinging on zones of the phosphor layer which have not yet been stimulated to emit emission light. Through such prior stimulation of emission light—i.e., stimulation occurring before the read-out process itself—a part of the information stored in these zones would be destroyed, resulting in significant losses of intensity and definition in a subsequent read-out of the latent image from these zones of the phosphor layer. With the apparatus according to the invention these losses are minimised in that the stimulation light reflected by the phosphor layer is directed onto zones which have already been read.

In a preferred embodiment of the invention it is provided that the first angle of inclination of the irradiation device and the second angle of inclination of the detection device are selected, while taking into account a first aperture angle of the irradiation device, in such a way that the components of the stimulation light impinging on the phosphor layer within the first aperture angle of the irradiation device, which are reflected by the phosphor layer and then by the detection device, impinge on zones of the phosphor layer in which emission light has already been stimulated. With the first aperture angle, account is taken of the convergence or divergence of a bundle of rays issuing from the irradiation device and impinging on the phosphor layer. Undesired premature stimulation of the phosphor layer is thereby reliably prevented, so that losses of intensity and definition can be kept especially low.

In another solution it is provided that the irradiation device is arranged ahead of the detection device with respect to a transport direction in which the apparatus is moved to individual zones relative to the phosphor layer between read-out operations. The apparatus is consequently moved over the phosphor layer with the irradiation device leading. It is thereby achieved that a major part of the stimulation light scattered in the phosphor layer is scattered in a direction opposite to the transport direction. The scatter of stimulation light therefore takes place predominantly in zones of the phosphor layer which have already been stimulated to emit emission light in preceding read-out operations. Because only a small proportion of the stimulation light scattered in the phosphor layer is thereby scattered into zones not yet read out, losses of intensity and definition are sharply reduced.

This solution, in which losses of intensity and definition caused by scatter in the phosphor layer are reduced is preferably combined with the apparatus according to the invention, in which losses of intensity and definition caused by reflections from the phosphor layer are reduced, by which combination especially high image quality is achieved. However, this solution can also represent an alternative to the apparatus according to the invention, since it already leads to very high image quality independently of the apparatus according to the invention.

In a preferred refinement of the invention the first angle of inclination of the irradiation device is greater than or equal to the sum of the second angle of inclination of the detection device and half the first aperture angle of the irradiation device. Through this condition losses of intensity and definition can be reduced with especially high reliability.

In an alternative embodiment of the invention it is provided that the irradiation device is arranged after the detection device with respect to a transport direction in which the apparatus is moved to individual zones relative to the phosphor layer between read-out operations, and the first angle of inclination of the irradiation device is less than or equal to the difference between the second angle of inclination of the detection device and half the first aperture angle of the irradiation device. Although increased scatter of stimulation light components towards zones of the phosphor layer not yet stimulated occurs with this configuration, relatively high intensity and definition are nevertheless ensured by the inventive setting of the first and second inclination angles while taking account of the first aperture angle of the irradiation device.

The first inclination angle of the irradiation device preferably assumes the smallest possible values. The proportion of stimulation light reflected by the phosphor layer is thereby reduced while the penetration depth of the stimulation light into the phosphor layer is simultaneously increased, leading to increased stimulation of emission radiation and therefore to higher intensity of the emission light emitted. In addition, with small inclination angles of the irradiation device the width of the linear zone stimulated on the phosphor layer is reduced and higher image definition in the transport direction of the apparatus is thereby ensured. The first inclination angle of the irradiation device is preferably less than 40°.

In an especially preferred embodiment the first inclination angle of the irradiation device is not more than 10° greater than the sum of the second inclination angle of the detection device and half the first aperture angle of the irradiation device. Intensity and signal losses are thereby kept especially low.

A further embodiment of the invention provides that the detection device has a second aperture angle and that the sum of the first inclination angle of the irradiation device and the second inclination angle of the detection device is greater than or equal to half the sum of the first aperture angle of the irradiation device and the second aperture angle of the detection device. Partial shading of the stimulation light by individual components of the detection device, or of the emission light to be detected by individual components of the irradiation device, can thereby be reliably prevented. Losses in the intensity of the emission light to be detected can thereby be avoided.

In a further embodiment of the invention it is provided that the second inclination angle of the detection device is less than 30°. Assuming a Lambertian radiation characteristic of the emission light, an intensity of the emission light decreasing with the cosine of the second inclination angle would be expected. Experiments have shown, however, that the intensity of the detected emission light within this angular range is, surprisingly, substantially constant, so that no losses, or only negligible losses, of intensity occur here.

In a further alternative solution the irradiation device is so configured that the stimulation light impinges on the phosphor layer in a first zone, in particular on a stimulation light line, and that the detection device is so arranged or configured that it detects the emission light issuing from a second zone of the phosphor layer, the second zone being offset with respect to the first zone by a specific distance in the transport direction in which the apparatus is moved relative to the phosphor layer. In the second zone a higher intensity of the emission light to be captured is detected than in the first zone, ensuring high quality of the image read out.

This solution is preferably combined with the inventive apparatus in which intensity and definition losses caused by reflections by the phosphor layer are reduced, by which combination especially high image quality is achieved. In general, however, this solution may also represent an alternative to the inventive apparatus, since it leads to very high image quality independently of the inventive apparatus.

BRIEF DESCRIPTION OF THE DRAWINGS

The invention is described in more detail below with reference to Figures, in which.

DETAILED DESCRIPTION OF THE INVENTION

Figure 1:
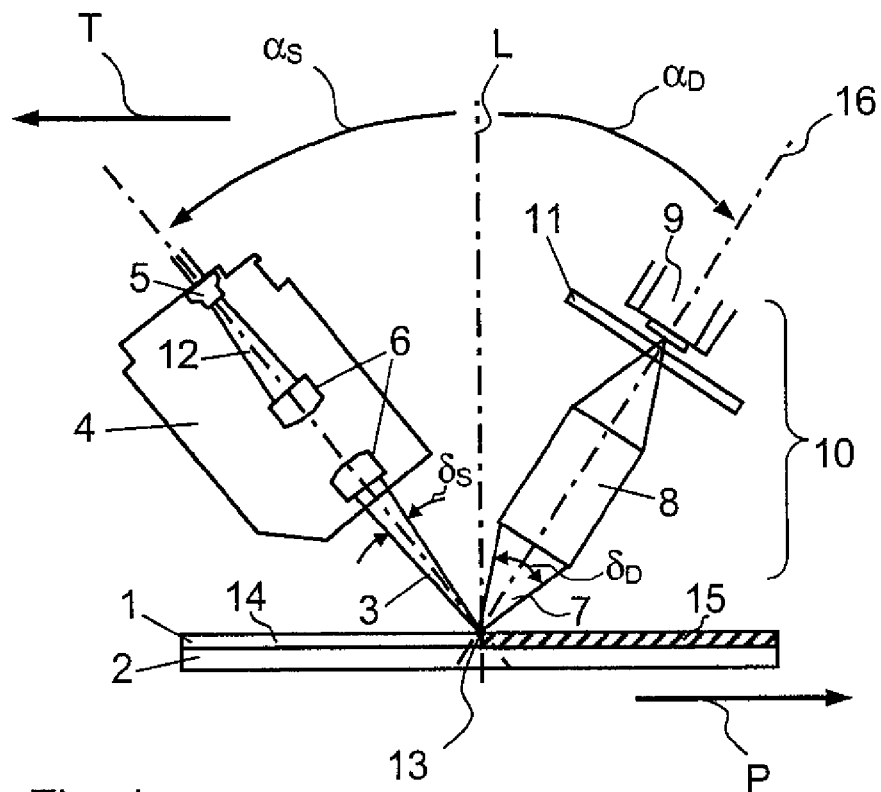
FIG. 1 shows an embodiment of the apparatus according to the invention.

FIG. 1 shows an embodiment of the apparatus according to the invention. A phosphor layer 1 to be read out is located on a carrier layer 2 and is irradiated with stimulation light 3 generated by an irradiation device 4. The irradiation device 4 includes a radiation source 5 and optical elements 6 which focus the stimulation light issuing from the radiation source 5 on to the phosphor layer 1.

The radiation source 5 preferably comprises a plurality of individual light sources, for example, light-emitting diodes or laser diodes arranged in a row disposed perpendicularly to the drawing plane. The optical elements 6 are preferably configured as two elongated cylindrical lenses which are disposed substantially parallel to the individual light sources arranged in a row.

The divergent stimulation light bundles 12 issuing from the individual light sources of the radiation source 5 are focused in the drawing plane by the optical elements 6 configured as cylindrical lenses and impinge on the phosphor layer 1 as a convergent radiation bundle of stimulation light 3. As this happens the divergent stimulation light bundles 12 of the individual light sources are superimposed on one another perpendicularly to the drawing plane in such a way that the convergent radiation bundle of stimulation light 3 describes a continuous stimulation light line 13 disposed perpendicularly to the drawing plane on the phosphor layer 1. The convergence angle of the radiation bundle of stimulation light 3 corresponds substantially to the aperture angle $\delta_S$ of the irradiation device 4. The irradiation device 4 includes with the normal L on the phosphor layer 1 a first inclination angle $\alpha_S$.

The emission light 7 stimulated and radiated in the phosphor layer 1 in the zone of the stimulation light line 13 is captured with a detection device 10. In the example illustrated the detection device 10 includes a detector 9 and an optical arrangement 8 which focuses the emission light 7 on the detector 9. Self-focusing lenses, microlenses or gradient index lenses arranged in each case in a row disposed perpendicularly to the drawing plane are, for example, suitable for the optical arrangement 8. The detector 9 preferably includes a multiplicity of photosensitive detector elements arranged in a row perpendicularly to the drawing plane and is in the form, in particular, of a CCD row. Locally resolved detection of the emission light 7 issuing from the stimulation light line 13 stimulated on the phosphor layer 1 is achieved with the above-described detection device 10.

The detection device 10 is inclined at a second inclination angle $\alpha_D$ with respect to the normal L on the phosphor layer 1 and has a second aperture angle $\delta_D$.

Optionally, an optical filter 11 which is transparent in a wavelength range of the emission light 7 and is substantially opaque in the wavelength range of the stimulation light may be provided in the beam path between the phosphor layer 1 and the detector 9. It is thereby ensured that the capture of the emission light is not distorted by components of stimulation light which are reflected by the phosphor layer 1 and can reach the detector 9.

The optical filter 11 is preferably arranged at an angle deviating from 90° with respect to the optical axis 16, i.e. the optical filter 11 is tilted through a few angular degrees as compared to its position shown in FIG. 1. It is thereby prevented that reflected emission and/or stimulation light 7, 3 can again reach the phosphor layer 1 and interfere with the stimulation and read-out processes occurring there.

In the embodiment illustrated, the apparatus consisting of the radiation device 4 and the detection device 10 is moved with a transport mechanism (not shown) in transport direction T over the stationary phosphor layer 1, different zones of the phosphor layer 1 being stimulated successively by the stimulation light line 13, and the emission light 7 emitted in each case being captured.

The detection device 10 is preferably so arranged or configured that it captures the emission light 7 issuing from a linear zone of the phosphor layer 1, the linear zone not coinciding exactly with the stimulation light line 13 but being offset by a specific distance in transport direction T, i.e., being located ahead of the stimulation light line 13. Typical widths of the stimulation light line 13 are in the range between approx. 80 μm and 120 μm. Typical distances by which the linear zone is offset in transport direction T are between approximately 100 μm and 150 μm. In this linear zone a higher intensity of the emission light 7 to be captured is detected than directly on the stimulation light line 13. This surprising effect can be explained by a scatter of stimulation light in the phosphor layer 1 whereby emission light is stimulated not only directly in the zone of the stimulation light line 13 itself but also in directly adjacent zones. Because the adjacent zone in the direction opposite to the transport direction T has already been stimulated and read, this zone emits only a small amount of emission light on renewed stimulation. By contrast, the linear zone adjacent in transport direction T and not yet read emits more emission light. The centre of gravity of the intensity of the emission light emitted is thereby offset in transport direction T with respect to the stimulation light line 13.

The stimulation light 3 is generally not only absorbed upon stimulation of emission light 7 in the phosphor layer 1, but is also partially reflected. This partial reflection is not only a specular reflection but rather a directed scatter of the stimulation light 3 impinging on the phosphor layer 1. The stimulation light 3 reflected or scattered in a directed manner by the phosphor layer 1 can then impinge on the detection device 10, in particular on the optical arrangement 8, where it is also reflected. In this case it can occur that the stimulation light 3 reflected in this way also impinges on zones 14 of the phosphor layer 1 which have not yet been read. Through this premature stimulation of unread zones 14 both the intensity of the emission light to be captured and the definition of the stimulation light line 13 stimulated in each case are significantly reduced during the subsequent read-out process itself. To avoid these intensity and definition losses the first inclination angle $\alpha_S$ of the irradiation device 4 and the second inclination angle $\alpha_D$ of the detection device 10 are selected such that stimulation light 3 reflected by the phosphor layer 1 and the detection device 10 impinges on zones 15 of the phosphor layer 1 in which emission light 7 has already been stimulated. Intensity and definition losses through prior stimulation are thereby sharply reduced.

In the selection of the first and second inclination angles $\alpha_S$ and $\alpha_D$ respectively, account is preferably taken of the aperture angle $\delta_S$ of the irradiation device 4. As practical experiments have shown, if even only extremely small aperture angles $\delta_S$ of the irradiation device 4 are taken into account, surprisingly large gains in intensity and definition are obtained in comparison to angular settings which do not take account of the aperture angle $\delta_S$ of the irradiation device. It is therefore supposed that even relatively small deviations from the first inclination angle $\alpha_S$ of the stimulation light rays 3 impinging on the phosphor layer 1 can give rise to unexpectedly large losses of intensity and definition resulting from prior stimulation of unread zones 14 of the phosphorus plate 1.

An especially reliable reduction in the intensity and definition losses is achieved in the embodiment illustrated in that the first inclination angle $\alpha_S$ of the irradiation device 4 is greater than or equal to the sum of the second inclination angle $\alpha_D$ of the detection device 10 and half the first aperture angle $\delta_S$ of the irradiation device 4.

Figure 2:
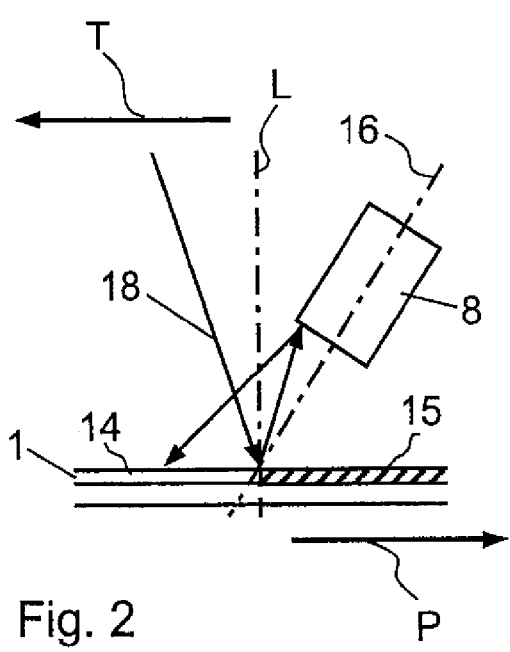
FIG. 2 is a first schematic representation of reflections of the stimulation light.
Figure 3:
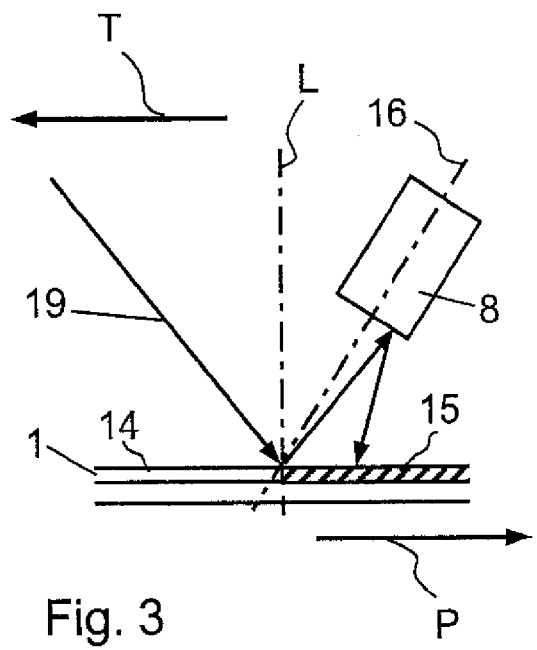
FIG. 3 is a second schematic representation of reflections of the stimulation light.

To clarify the reflection processes, FIGS. 2 and 3 are schematic representations of the reflections of stimulation light rays 18 and 19 respectively by the phosphor layer 1 and by the optical arrangement 8 of the detection device respectively. As in the embodiment illustrated in FIG. 1, in the examples selected here the irradiation device is moved together with the detection device in transport direction T relative to the phosphor layer 1.

In the example shown in FIG. 2 a ray 18 of the stimulation light impinges on the phosphor layer 1 and is partially reflected by the latter. The reflected component of the ray impinges on the optical arrangement 8 of the detection device, is likewise reflected thereby and finally impinges on zones 14 of the phosphor layer 1 in which emission light has not yet been stimulated, i.e., which have not yet been read. The stimulation induced prematurely in the zones 14 is not desired, since it leads to losses of intensity and definition.

In the example shown in FIG. 3, by contrast, a ray 19 of the stimulation light impinges on the phosphor layer 1 at a flatter angle and is reflected by said phosphor layer 1 and by the flat end face of the optical arrangement 8 of the detection device 10 in such a way that it finally impinges on zones 15 of the phosphor layer 1 which have already been read. In this case the light rays 19 are reflected into the half-space on the detector side, with respect to the normal L.

As in the example shown in FIG. 1, in the example illustrated in FIG. 3 the first and second inclination angles $\alpha_S$ and $\alpha_D$ are selected such that light rays 19 impinging on the phosphor layer 1 within the aperture angle $\delta_S$ of the irradiation device 4 are reflected by the end face of the optical arrangement 8 in such a way that they impinge exclusively on zones 15 of the phosphor layer 1 which have already been read. Intensity and definition losses through prior stimulation resulting from reflected stimulation light rays are thereby especially reliably reduced.

In the embodiments according to FIGS. 1 to 3 the side of the detection device 10 by which the stimulation light reflected by the phosphor layer 1 is reflected is formed by the flat end face which is disposed perpendicularly to the optical axis 16 of the optical arrangement 8. The above-mentioned relationships for selecting the first and second inclination angles $\alpha_S$ and $\alpha_D$ and the aperture angle $\delta_S$ relate to such an arrangement. However, in cases in which the flat end face of the detection device 10 deviates by a given angular amount from this perpendicular position with respect to the optical axis 16, said angular amount must be taken into account in the relationships specified, said angular amount being added to or subtracted from the second inclination angle $\alpha_D$, depending on the direction of the deviation.

In the embodiments illustrated in FIGS. 1 to 3 the irradiation device 4 is arranged ahead of the detection device 10 with respect to transport direction T, i.e., the device for reading out the information contained in the phosphor layer 1 moves over the phosphor layer 1 with the irradiation device 4 leading. It is thereby achieved that a major part of the stimulation light 3 scattered in the phosphor layer 1 is scattered into zones 15 which have already been read, and only a small part is scattered into zones 14 of the phosphor layer 1 not yet read. Intensity and definition losses resulting from scatter processes can thereby be significantly reduced. In combination with the avoidance of premature stimulation resulting from reflection processes by appropriate selection of inclination angles $\alpha_S$ and $\alpha_D$, in particular while taking account of the first aperture angle $\delta_S$ of the irradiation device 4, intensity and definition losses are especially sharply reduced.

In the embodiment described the irradiation device 4 and the detection device 10 are moved over the phosphor layer 1. Self-evidently, the above-mentioned embodiments are also valid if the irradiation device 4 and the detection device 10 are stationary and the phosphor layer 1 located on the carrier layer 2 is transported in movement direction P relative to said irradiation device 4 and detection device 10. The same applies to embodiments in which both the irradiation device 4 and the detection device 10 are moved in transport direction T and the phosphor layer 1 located on the carrier layer 2 is moved in movement direction P.

Alternatively, it may also be provided that the irradiation device 4 and the detection device 10 are moved relative to the phosphor layer 1 in the direction opposite to the transport direction T marked in FIG. 1. In such an embodiment, depending on the values of the first inclination angle $\alpha_S$ and of the first aperture angle $\delta_S$ of the irradiation device 4, higher intensity and definition losses must be accepted because of scatter processes in the phosphor layer 1. In order nevertheless to keep at least the intensity and definition losses resulting from reflections especially low in this case, the first inclination angle $\alpha_S$ of the irradiation device 4 is selected such that said inclination angle $\alpha_S$ is less than or equal to the difference between the second inclination angle $\alpha_D$ of the detector device 10 and half the first aperture angle $\delta_S$ of the irradiation device 4.

In a further preferred embodiment of the invention it is provided that the first inclination angle $\alpha_S$ of the irradiation device 4 assumes the smallest possible values. It is thereby achieved that the component of the stimulation light 3 reflected by the phosphor layer 1 is kept small and undesired effects resulting from premature stimulation of zones 14 of the phosphor layer 1 not yet read are therefore additionally reduced. At the same time, small first inclination angles $\alpha_S$ also enable a larger proportion of the stimulation light 3 to penetrate more deeply into the phosphor layer 1 and to stimulate emission light therein. The intensity of the emission light 7 to be detected is thereby increased. In addition, through small first inclination angles $\alpha_S$ the width of the stimulated stimulation light line 13 on the phosphor layer 1 is kept small, whereby high definition is ensured. Not least, through the smallest possible first inclination angles $\alpha_S$ the extent of scatter of stimulation light 3 in the phosphor layer 1 is reduced, so that the losses of intensity and, in particular, of definition resulting from scatter processes in the phosphor layer 1 are reduced. Each of these individual effects achieved through small first inclination angles $\alpha_S$ contributes to increasing the quality of the image read out.

In the embodiment illustrated in FIG. 1 the first angle of inclination $\alpha_S$ of the irradiation device 4 is preferably not more than 10° greater than the sum of the second inclination angle $\alpha_D$ of the detection device 10 and half the first aperture angle $\delta_S$ of the irradiation device 4. The inventive reduction of intensity and definition losses resulting from reflections is thereby combined with the above-mentioned advantages of a small first inclination angle $\alpha_S$ of the irradiation device. In this way intensity and definition losses are especially sharply reduced.

To avoid shading of the stimulation light 3 by components of the detection device 10, and of the emission light 7 by components of the irradiation device 4, it is provided that the sum of the first inclination angle $\alpha_S$ of the irradiation device 4 and the second inclination angle $\alpha_D$ of the detection device 10 is greater than or equal to half the sum of the first aperture angle $\delta_S$ of the irradiation device 4 and the second aperture angle $\delta_D$ of the detection device 10. In this case the second inclination angle $\alpha_D$ of the detection device 10 is preferably less than 30° in order to keep intensity losses of the emission light 7 to be detected as low as possible.

To sum up, in the embodiment illustrated in FIG. 1 any intensity and/or definition losses are minimised and the quality of the image information captured is improved in that the first inclination angle $\alpha_S$, the second inclination angle $\alpha_D$, the first aperture angle $\delta_S$ and the second aperture angle $\delta_D$ fulfil at least one of the following conditions, in particular all of the following conditions:

$$\alpha_S \geq \alpha_D + \delta_S/2 \qquad \text{i)}$$

$$\alpha_S \text{ is as small as possible, in particular } \alpha_S \leq \alpha_D + \delta_S/2 + 10° \qquad \text{ii)}$$

$$\alpha_S + \alpha_D \geq (\delta^S + \delta_D)/2 \qquad \text{iii)}$$

$$\alpha_D \leq 30°. \qquad \text{iv)}$$

In the example illustrated in FIG. 1 the optical arrangement 8 is constructed symmetrically, its first optical axis 16 passing through the centre of the second aperture angle $\delta_D$. The corresponding case exists for the irradiation device 4, the optical axis of which passes through the centre of the first aperture angle $\delta_S$. It is also possible in principle, however, to configure the optical arrangement 8 and/or the irradiation device 4 asymmetrically, so that their respective optical axes divide the second aperture angle $\delta_D$ and the first aperture angle $\delta_S$ into two partial angles of unequal size, $\delta_{D1}$ and $\delta_{D2}$, and $\delta_{S1}$ and $\delta_{S2}$, respectively. In the case of these embodiments the above exposition and the relations i) to iv) apply correspondingly, it being necessary to substitute the respective partial angle $\delta_{D1}$ or $\delta_{D2}$, and $\delta_{S1}$ or $\delta_{S2}$, for half the second and first aperture angle $\delta_D/2$ and $\delta_S/2$ respectively.

The invention claimed is:

1. An apparatus for capturing information contained in a phosphor layer, comprising:
    an irradiation device for irradiating the phosphor layer with stimulation light which is adapted to stimulate emission light in the phosphor layer, the irradiation device being inclined at a first angle of inclination ($\alpha_S$) with respect to normal (L) on the phosphor layer, wherein the irradiation device comprises optics for focusing the stimulation light onto the phosphor layer with a beam convergence angle defined as a first aperture angle ($\delta_S$); and
    a detection device for capturing emission light stimulated in the phosphor layer, the detection device being inclined at a second angle of inclination ($\alpha_D$) with respect to the normal (L) on the phosphor layer,
    wherein the irradiation device is arranged ahead of the detection device with respect to a transport direction (T) in which said apparatus is moved relative to the phosphor layer, wherein the first angle of inclination ($\alpha_S$) of the irradiation device and the second angle of inclination ($\alpha_D$) of the detection device are selected such that components of the stimulation light reflected by the phosphor layer and then by the detection device impinge on zones of the phosphor layer in which emission light has already been stimulated, and wherein the first angle of inclination ($\alpha_S$) of the irradiation device is greater than or equal to a sum of the second angle of inclination ($\alpha_D$) of the detection device and half of the first aperture angle ($\delta_S$) of the irradiation device:

$\alpha_S \geq \alpha_D + \delta_S/2$; and wherein the first angle of inclination ($\alpha s$) of the irradiation device is not more than the 10° greater than a sum ($\alpha_D + \delta_S/2$) of the second angle of inclination ($\alpha_D$) of the detector device and half the first aperture angle ($\delta_S$) of the irradiation device;

wherein the stimulation light of the irradiation device impinges on the phosphor layer in a stimulation light line and the detection device is arranged to capture the emission light issuing from a second zone of the phosphor layer, the second zone being offset with respect to the stimulation light line by a distance in the transport direction T in which the apparatus is moved relative to the phosphor layer.

2. An apparatus as claimed in claim 1, wherein the detection device has a second aperture angle ($\delta_D$) and a sum of the first angle of inclination ($\alpha_S$) of the irradiation device and the second angle of inclination ($\alpha_D$) of the detection device is greater than or equal to half a sum of the first aperture angle ($\delta_S$) of the irradiation device and the second aperture angle ($\delta_D$) of the detection device:

$\alpha_S + \alpha_D \geq (\delta_S + \delta_D)/2$.

3. An apparatus as claimed in claim 1, wherein the second angle of inclination ($\alpha_D$) of the detection device is less than 30°.

* * * * *